United States Patent [19]

Baird et al.

[11] 4,265,583
[45] May 5, 1981

[54] LIFT TRUCK FOR FACILITATING INSERTION AND REMOVAL OF HORIZONTAL DRAW-OUT SWITCHGEAR UNIT

[75] Inventors: Leslie L. Baird; Gary M. Stolz, both of Burlington, Iowa

[73] Assignee: General Electric Company, Philadelphia, Pa.

[21] Appl. No.: 933,934

[22] Filed: Aug. 15, 1978

[51] Int. Cl.³ .............................................. B65G 65/00
[52] U.S. Cl. ...................................... 414/284; 414/246
[58] Field of Search ............... 414/246, 247, 249, 281, 414/284, 607

[56] References Cited

U.S. PATENT DOCUMENTS

| | | | |
|---|---|---|---|
| 2,804,218 | 8/1957 | Sylvester et al. | 414/607 |
| 3,549,025 | 12/1970 | Messner | 414/607 |
| 3,602,379 | 8/1971 | Bosse | 414/284 |
| 3,738,506 | 6/1973 | Cornford et al. | 414/279 |

*Primary Examiner*—Lawrence J. Oresky
*Attorney, Agent, or Firm*—William Freedman

[57] ABSTRACT

A lift truck for transporting a movable switchgear unit into a position wherein the unit can be inserted horizontally into an upper-level space within a metal-clad switchgear cubicle comprises horizontally-extending rails along which said unit can be rolled during insertion into said cubicle. Means is provided for blocking insertion motion of the switchgear unit on said rails until the truck rails have been locked to rails in the cubicle in a position of substantial axial alignment between the truck rails and the cubicle rails.

5 Claims, 6 Drawing Figures

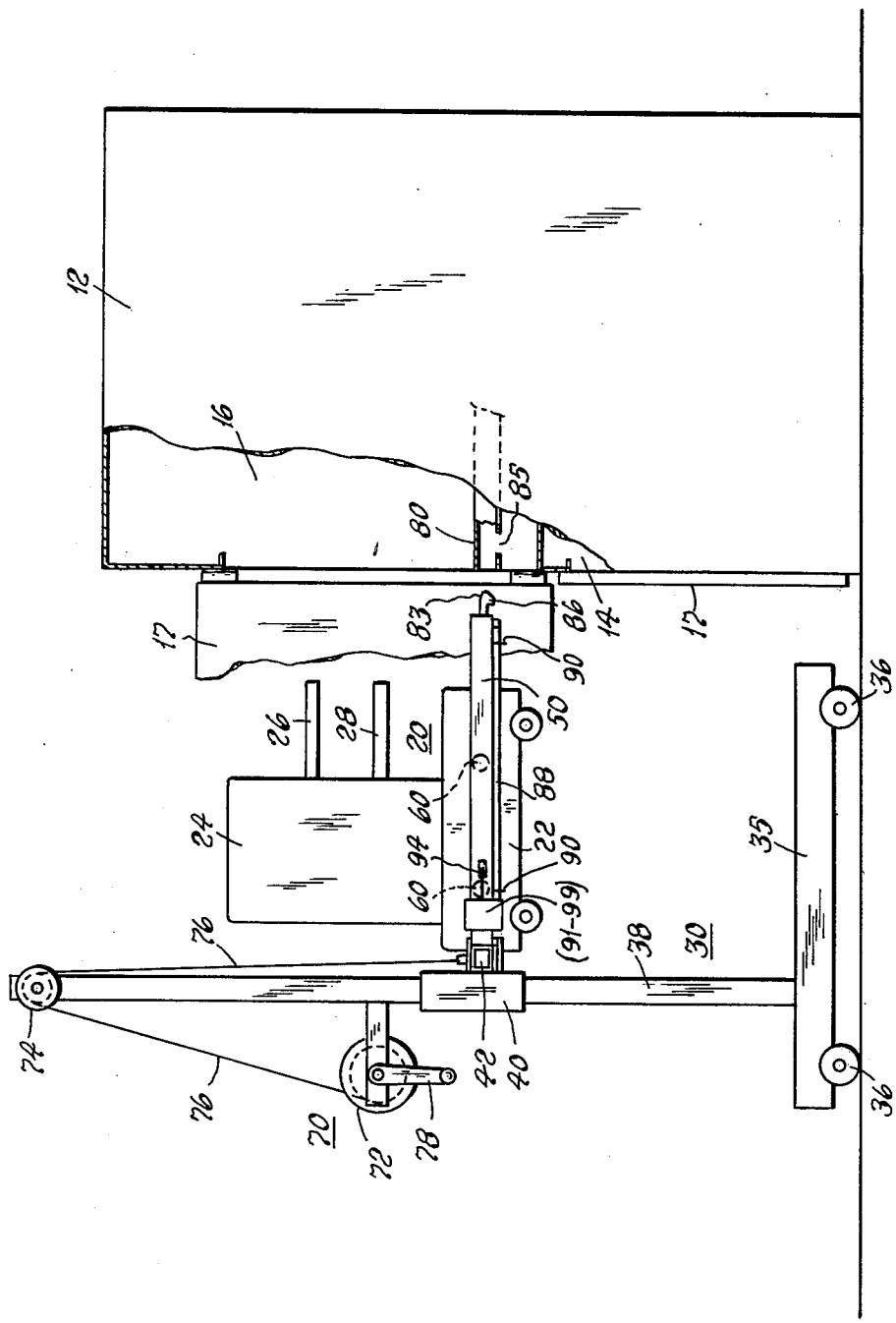

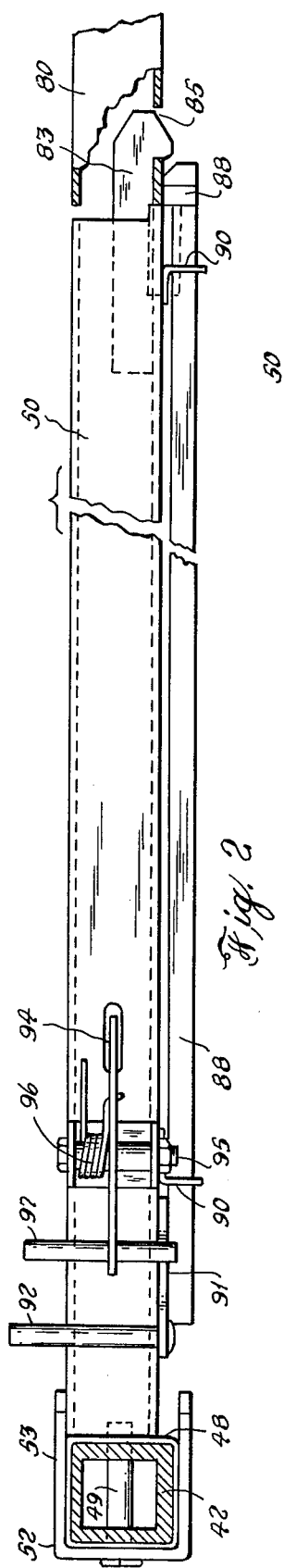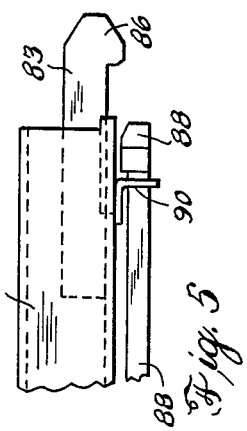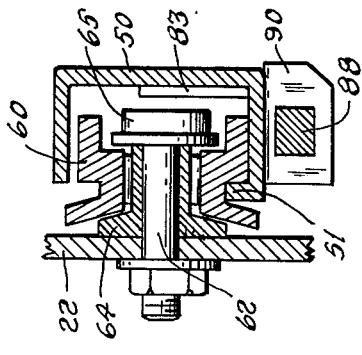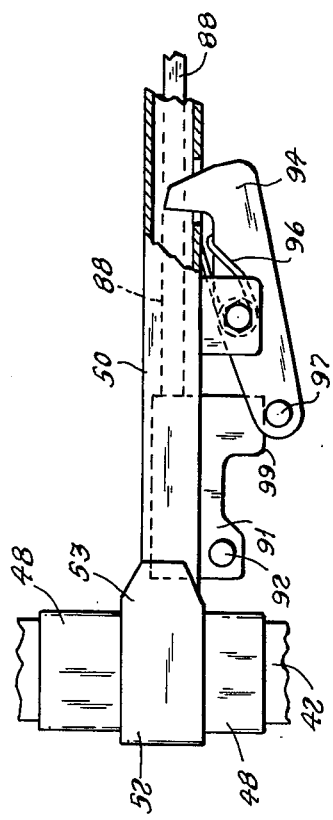

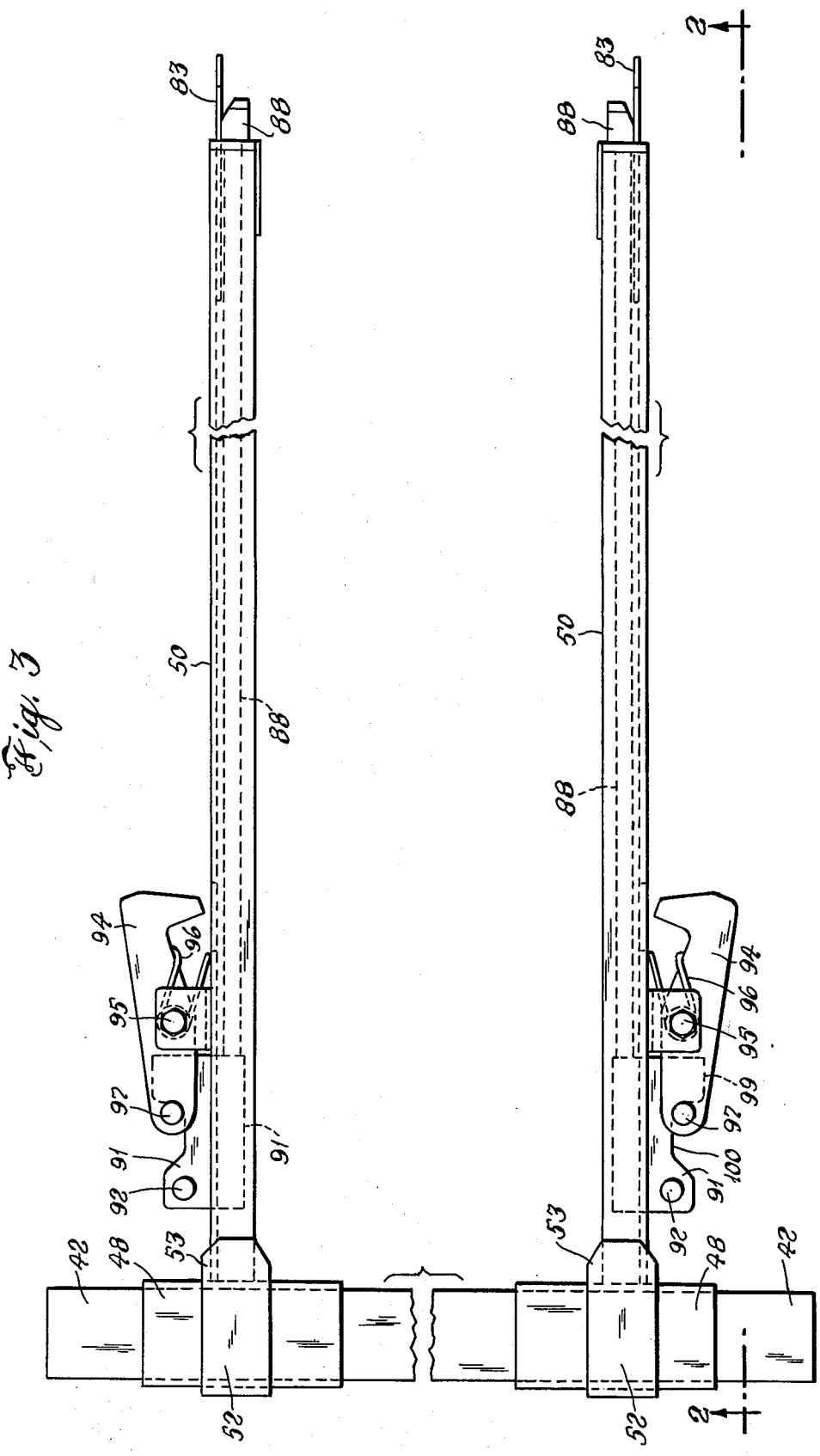

LIFT TRUCK FOR FACILITATING INSERTION AND REMOVAL OF HORIZONTAL DRAW-OUT SWITCHGEAR UNIT

BACKGROUND

This invention relates to a lift truck for transporting a movable switchgear unit into a position where it can be inserted horizontally into an upper-level space within a metal-clad switchgear cubicle.

The usual metal-clad switchgear equipment comprises a cubicle into which a movable switchgear unit can be inserted to connect the switchgear unit into a power circuit and from which it can be withdrawn to disconnect the switchgear unit from the power circuit. In the past, medium-voltage metal-clad switchgear (i.e., metal-clad switchgear rated at several thousand to 38 kV) of the horizontal draw-out type has typically included spaces only at floor level for receiving the movable switchgear unit. But more recent designs have included cubicle spaces above the floor-level spaces for receiving movable switchgear units. Such switchgear equipment is sometimes referred to as "two-high breaker" equipment.

With such two-high breaker equipment, it is necessary to provide some means for lifting the movable switchgear unit into an elevated position where it can be easily inserted into an upper-level cubicle space when the switchgear unit is being installed. It is also necessary that such means be capable of receiving the movable switchgear unit when it is withdrawn from the upper-level cubicle space and that such means be operable to lower the switchgear unit to floor level. For carrying out these functions, we utilize a fork-type lift truck that comprises two horizontally-spaced, horizontally-extending rails along which the movable switchgear unit can be rolled in a horizontal direction.

Installation of a switchgear unit using this truck is effected by first positioning the unit on the rails of the truck, then lifting the rails into an elevated position where they axially align with horizontally-extending rails in the upper-level cubicle space, and then rolling the switchgear unit along these aligned rails into a connected position within the cubicle. Removal of the switchgear unit is effected by rolling the unit out along the aligned rails into a fully-removed position on the lift truck and then lowering the rails of the truck to floor level, where the unit can be removed by rolling it off the truck rails.

A problem that can be encountered when such a lift truck is used for installing the movable switchgear unit in the upper-level cubicle space is that the truck rails may not be properly positioned and aligned with respect to the cubicle rails prior to or during roll-in of the switchgear unit. This can possibly result in derailment of the switchgear unit and resultant damage to it.

SUMMARY

An object of our invention is to assure that the rails of the lift truck are locked with respect to the cubicle rails in a fixed position of substantially axial alignment prior to and during roll-in of the switchgear unit along said rails.

Another object is to provide the assurance of the immediately-preceding paragraph with a simple, inexpensive interlock structure that does not interfere with the ability of the switchgear unit to be rolled into or out of the cubicle along the aligned rails.

In carrying out our invention in one form, we provide a lift truck comprising a pair of horizontally-spaced, substantially horizontally-extending rails along which the horizontal draw-out switchgear unit can be rolled as it is moved toward its inserted position within the cubicle. The truck also comprises means for selectively raising and lowering the truck rails while the switchgear unit is positioned thereon. The truck also comprises locking means operable after the truck rails have been raised for locking the truck rails in a fixed position with respect to the cubicle rails where the truck and cubicle rails are substantially axially aligned. Insertion-blocking means is provided that is effective when in a first position for blocking insertion motion of the switchgear unit on the truck rails and effective in a second position to provide no such blocking action. Means is further provided to prevent operation of the insertion-blocking means from said first to said second position until said locking means has been operated into a position for locking said truck rails to said cubicle rails in substantially axially-aligned relationship.

BRIEF DESCRIPTION OF DRAWINGS

For a better understanding of the invention, reference may be had to the following description taken in connection with the accompanying drawings, wherein:

FIG. 1 is a side elevational view, mostly schematic, showing a lift truck embodying one form of our invention to be used for installing a switchgear unit in a metal-clad cubicle.

FIG. 2 is a side elevational view of one of the rails present in the lift truck of FIG. 1. This view is taken along the line 2—2 of FIG. 3, but the truck rail is shown locked to a cubicle rail 80.

FIG. 3 is a plan view showing the two spaced-apart truck rails mounted on the cross-beam of the truck. The cubicle rails are omitted from this view for clarity.

FIG. 4 is an enlarged sectional view showing one of the rollers of the switchgear unit and the truck rail on which it is adapted to roll.

FIG. 5 is a fragmentary view of the locking means used for locking one of the truck rails to one of the cubicle rails. The locking member 88 is depicted in its retracted position. The cubicle rail is not shown in this view.

FIG. 6 shows a portion of FIG. 3 in a condition wherein the latch 94 is in its insertion-blocking position and the locking member 88 is retracted.

DETAILED DESCRIPTION OF PREFERRED EMBODIMENT

Referring now to FIG. 1, there is shown metal-clad switchgear equipment comprising a metal cubicle 12 for receiving removable switchgear units, such as electric circuit breakers, in a two-high breaker arrangement. The cubicle 12 includes a lower-level space 14 for receiving one switchgear unit and an upper-level space 16 for receiving another switchgear unit. The entrance to each of these spaces is normally covered by a door 17, the lower one of which is shown closed and the upper one of which is shown open in FIG. 1.

A switchgear unit that is to be received in the upper space 16 is shown at 20. This switchgear unit comprises a mechanism housing 22 and an interrupter housing 24 supported on the mechanism housing. Horizontally-projecting conductive studs 26 and 28 are provided for connecting the interrupter (not shown) within housing 24 into the power circuit that is to be controlled by the switchgear unit 20. Within the metal cubicle 12 are stationary disconnect contacts (not shown) that the studs 26 and 28 are adapted to mate with when the switchgear unit is fully inserted into the cubicle, thereby connecting the switchgear unit into the power circuit. The power circuit (not shown) into which the switchgear unit 20 is adapted to be connected is housed within cubicle 12 and is suitably electrically insulated therefrom.

The two-high breaker arrangement provides for major savings in floor space, but it does require that some means be provided for lifting the switchgear units when they are to be installed in the upper spaces and for lowering them when they are to be removed. For carrying out these functions, we utilize a fork-type lift truck shown at 30 in FIG. 1.

This lift truck 30 comprises a rectangular base 35 mounted on wheels 36 adjacent each of its corners. Fixed to the base 35 and projecting upwardly therefrom in a vertical direction is a support column 38 along which a carriage 40 is adapted to be moved in a vertical direction. The carriage 40 carries a cross-beam 42 that extends in a horizontal direction and is fixed to the carriage at a location disposed centrally of the cross-beam's length. The cross-beam is a sturdy metal member, preferably hollow and of square cross-section. Referring to FIGS. 2 and 3, adjustably mounted on the cross-beam 42 are two rails 50, each of channel-shaped cross-section. These rails 50 are disposed in horizontally spaced-apart relationship, and each extends forwardly from the cross-beam 42 to a location near the front end of the truck, as shown in FIG. 1. For mounting each rail 50 on the cross-beam 42, there is provided a short section of tubing 48, best shown in FIGS. 2 and 3, having a square cross-section to which the rail is suitably welded at its left hand end. Reinforcement of the joint between the rail and the tubing 48 is provided by a U-shaped yoke member 52 that embraces the tubing 48 and has an upper arm 53 welded to the rail and also to the tubing. The square tubing 48 slidably receives the cross-beam 42 and can be slid longitudinally along the cross-beam to suitably position the rail, following which the tubing is locked in the selected position by an adjusting pin 49 extending through registering openings in the cross-beam 42 and the tubing 48.

In FIG. 1, the removable switchgear unit 20 is shown positioned on the rails 50 and in an elevated position in preparation for being inserted horizontally into the upper-level space 16 in the cubicle 12. For supporting the switchgear unit 20 on the rails 50, the mechanism housing 22 of the switchgear unit is provided with two spaced-apart rollers 60 at each of its sides. As shown in FIG. 4, these rollers 60 fit within the channel-shaped rails 50. Each roller contains a peripheral groove that receives an upwardly projecting lip 51 on the inner edge of the lower arm of the associated channel 50. This interesting relationship serves to prevent the rails from separating when holding a switchgear unit.

Referring further to FIG. 4, it can be seen that the roller 60 is mounted on a spindle 62 that is fixed to the mechanism housing 22 of the switchgear unit. A hub 64 is clamped between a shoulder 65 on the end of the spindle and the wall of housing 22, and the roller 60 surrounds this hub and is rotatably mounted thereon.

Referring to FIG. 1, for raising and lowering the rails 50, a winch 70 of a suitable conventional design is provided. This winch comprises first pulley structure 72 mounted on column 38, an idler pulley 74, mounted atop column 38, and a steel cable 76 interconnecting the first pulley structure 72 and the carriage 40 via a path extending around the periphery of idler pulley 74. A handle 78 is provided for operating the winch.

After the switchgear unit 20 has been loaded on the truck rails 50 while the rails are in a lowered position (not shown), the winch 70 is operated to lift the carriage 40, the rails 50, and the switchgear unit 20 into their position of FIG. 1. In this position the truck rails 50 are slightly higher than the rails 80 in the cubicle on which it is desired to mount the switchgear unit.

These rails 80 in the cubicle are of the same cross-sectional configuration as the rails 50 of the lift truck. One rail is provided on the metal wall at each side of the cubicle opening 16. The truck rails 50, it is to be noted, are adjusted in a horizontal direction on the cross-beam 42 so that they are horizontally spaced by the same amount as the cubicle rails 80.

The front end of each truck rail 50 is equipped with a hook-shaped docking finger 83 which is adapted to engage a rectangular slot 85 in the associated cubicle rail 80 as part of a docking operation of the lift truck against the cubicle 12 preparatory to insertion of the switchgear unit 20. This docking operation is effected by rolling the lift truck forwardly from its position of FIG. 1 until the downwardly projecting portion 86 of the docking finger is disposed in registery with the slot 85. Then the carriage 40 is lowered slightly, causing the downwardly projecting portion 86 of each docking finger to enter the associated slot 85. This internesting relationship restrains each truck rail 50 from shifting horizontally with respect to the associated cubicle rail 80. But the presence of the docking fingers 83 in slots 85 is not sufficient by itself to prevent all movement of the truck rails 50 relative to the cubicle rails 80. It is still possible for the free ends of the truck rails to be forced upwardly, slightly, but nevertheless sufficiently, to permit the docking fingers 83 to disengage the slots 85. This is a possibility even though the carriage 40 may be locked in a fixed vertical position on column 38 since some torsional deflection of the cross-beam 42 is still possible, and only a slight amount of such deflection could permit sufficient displacement of the free ends of rails 50 to cause such undesired disengagement of the docking fingers.

To prevent such upward displacement of the free ends of the truck rails 50, we have provided the lift truck with two locking members 88, each slidably mounted beneath an associated truck rail 50. When the projecting portion 86 of a docking finger has entered its associated slot 85 in a cubicle rail, the locking member 88 can be extended, by a manual operation, in a forward direction into its position of FIG. 2, thus engaging the underside of the cubicle rail 80 and thereafter preventing any upward movement of the truck rail 50 with respect to the cubicle rail 80.

Each locking member 88 comprises a horizontal rod portion slidably mounted for horizontal motion on the underside of a truck rail 50 by suitable guides 90. At its rear end this horizontal rod portion has a cam plate 91 fixed thereto and a vertical rod 92 fixed to the cam plate 91. This vertical rod 92 can be grasped by an operator to move the locking member to the left into the retracted position shown in FIG. 6 from its locking position of FIGS. 2 and 3 thereby to retract it from the underside of the cubicle rail 80, thereby unlocking the two rails. Conversely, the vertical rod 92 can be operated to the right from its retracted position of FIG. 6 to return the locking member 88 to its extended, or locking, position of FIGS. 2 and 3.

When the switchgear unit 20 is supported on the truck rails 50 and in its normal position of FIG. 1, it is prevented from rolling off the truck by insertion-blocking means comprising a latch 94, shown in FIG. 3 in a retracted position and in FIG. 6 in a latching position. Referring to FIG. 3, this latch 94 is pivotally mounted on a pivot 95 fixed to the truck rail 50 and is biased toward its retracted position of FIG. 3 by a torsion spring 96. The latch 94 carries a follower pin 97 at its rear end that cooperates with the cam plate 91.

When the latch 94 is in its latching position of FIG. 6, a projecting nose on the latch extends through a rectangular opening in the truck rail 50. This nose is positioned slightly ahead of the rear roller 60 of the switchgear unit 20 when the switchgear unit is in its normal position of FIG. 1 on the lift truck, thus blocking forward motion of the switchgear unit on the truck rails, thereby preventing it from rolling off the truck rails.

When the switchgear unit is being transported by the lift truck on the rails 50, the locking member 88 and cam plate 91 connected thereto will normally be in the retracted position depicted in FIG. 6. When the cam plate 91 is in this retracted position, the projecting cam portion 99 is positioned in registry with follower pin 97 and thus the latch 94 is maintained in its latching position, thereby preventing forward, or insertion motion of the switchgear unit on the truck rails.

It is only when the locking member 88 is extended into its locking position of FIGS. 2 and 3 that the latch 94 is able to pivot into its retracted position, and only when the latch 94 is in its retracted position can the switchgear unit be moved from its normal position of FIG. 1 on the truck rails forwardly toward an inserted position within cubicle 12. It is to be noted that a notch 100 is provided in the cam plate 91 to allow the latch 94 to enter its fully retracted position of FIG. 3 when the locking member 88 is extended.

It will be apparent from the above description that the switchgear unit 20 is normally prevented from moving out of its position of FIG. 1 by the insertion-blocking latch 94. It is only when the lift truck 30 has been docked against the cubicle 12 with its rails 50 locked in axial alignment with the rails 80 of the cubicle by the extension of locking member 88 that the switchgear unit 20 can be inserted from its position of FIG. 1 into the cubicle 12 by rolling it forward on the truck rails 50 and then onto the aligned cubicle rails 80 locked to the truck rails.

After the switchgear unit 20 has thus been inserted into the cubicle 12, the lift truck is undocked from the cubicle. This undocking is accomplished by first pivoting the latch 94 with one hand against the bias of torsion spring 96 so that its nose projects through the rail as shown in FIG. 6. Thereafter, the locking member 88 is operated with the other hand by operating pin 92 to retract the cam plate 91 into its position of FIG. 6. This sequence of steps is repeated with the mechanism 91-99 on the other rail 50 of the truck. Then the rails 50 of the lift truck are elevated slightly, by operating winch 70, thus unhooking the docking fingers from the cubicle rails. Then the lift truck is rolled away from the cubicle 12.

In removing the switchgear unit from the cubicle, the lift truck is first docked against the cubicle. As a part of this docking operation the locking members 88 are extended to lock the truck rails 50 and cubicle rails 80 in alignment and to retract the latches 94. Then the switchgear unit is rolled along the aligned rails 80, 50 into its position of FIG. 1 on the truck. Then the locking members 88 are retracted to unlock the truck rails from the cubicle rails and, at the same time, to move the latches 94 into their latching position, thereby locking the switchgear unit on the truck. Thereafter the truck rails 50 are elevated slightly by use of winch 70 to unhook the docking fingers 83 from the cubicle rails 80, following which the loaded truck is rolled away from the cubicle 12.

It is to be noted that the docking fingers 83, although located within the channel-shaped truck rails 50, do not interfere with motion of the switchgear unit 20 along the truck and cubicle rails. This is the case because each docking finger 83 is a thin member located closely adjacent the vertical web portion of the channel-shaped rail 50, as may be seen in FIG. 4. The rollers 60, in moving along the rail, are forced by lip 51 to follow a path that is spaced slightly inwardly in a transverse direction from the docking finger, thereby preventing any interference between the rollers and the docking fingers as the rollers move past the docking fingers.

While we have shown and described a particular embodiment of our invention, it will be obvious to those skilled in the art that various changes and modifications may be made without departing from our invention in its broader aspects; and we, therefore, intend herein to cover all such changes and modifications as fall within the true spirit and scope of our invention.

What we claim as new and desire to secure by Letters Patent of the United States is:

1. A lift truck for transporting a movable switchgear unit into a position where said unit can be inserted horizontally into an upper-level space within a metal-clad switchgear cubicle, said cubicle having horizontally-spaced, substantially horizontally-extending rails in said upper-level space along which said unit is rolled during insertion thereof into said cubicle, said truck comprising:

(a) a pair of horizontally-spaced, substantially horizontally-extending truck rails along which said switchgear unit can be rolled as the switchgear unit is moved toward its inserted position within said cubicle, (b) means for selectively raising and lowering said truck rails while said switchgear unit is positioned thereon, (c) locking means operable after said truck rails have been raised for locking said truck rails in a fixed position with respect to said cubicle rails wherein said truck rails and said cubicle rails are substantially axially aligned said locking means being operable to lock said truck rails to said cubicle rails only when said truck rails and said cubicle rails are substantially axially aligned, (d) insertion-blocking means carried by said truck and movable with said truck rails while said truck rails are being raised or lowered, said insertion-blocking means being effective when in a first position for blocking insertion motion of said movable switchgear unit on said truck rails, and effective in a second position to provide no blocking of insertion motion of said switchgear unit on said truck rails, said insertion-blocking means being operable between said first and second positions, and (e) means also movable with said truck rails while said truck rails are being raised or lowered for preventing operation of said insertion-blocking means from said first to said second position until said locking means has been operated into a position for locking said truck rails to said cubicle rails in substantially axially-aligned relationship.

2. A lift truck for transporting a movable switchgear unit into a position where said unit can be inserted horizontally into an upper-level space within a metal-clad switchgear cubicle, said cubicle having horizontally-spaced, substantially horizontally-extending rails in said upper-level space along which said unit is rolled during insertion thereof into said cubicle, said truck comprising:
(a) a pair of horizontally-spaced, substantially horizontally-extending truck rails along which said switchgear unit can be rolled as the switchgear unit is moved toward its inserted position within said cubicle,
(b) means for selectively raising and lowering said truck rails while said switchgear unit is positioned thereon,
(c) locking means operable after said truck rails have been raised for locking said truck rails in a fixed position with respect to said cubicle rails wherein said truck rails and said cubicle rails are substantially axially aligned,
(d) insertion-blocking means carried by said truck, effective when in a first position for blocking insertion motion of said movable switchgear unit on said truck rails, and effective in a second position to provide no blocking of insertion motion of said switchgear unit on said truck rails, said insertion-blocking means being movable between said first and said second positions, and
(e) means for preventing operation of said insertion-blocking means from said first to said second position until said locking means has been operated into a position for locking said truck rails to said cubicle rails in substantially axially-aligned relationship, and in which:
(f) said locking means comprises a hook-shaped docking finger mounted on one of said truck rails at the front end thereof and projecting horizontally beyond said front end, said finger having a downwardly projecting end portion for fitting into a slot in one of said cubicle rails when a set of said truck and cubicle rails are substantially axially aligned, thereby restraining said set of truck and cubicle rails against horizontal movement with respect to each other,
(g) said locking means further comprises a locking member slidably mounted on said one truck rail and selectively movable into a locking position beneath the cubicle rail of said set wherein said locking member cooperates with said docking finger to lock the truck and cubicle rails of said set against vertical movement with respect to each other, and
(h) said means for preventing operation of said insertion-blocking means to an unblocking condition relative to said switchgear unit remains effective until said locking member has been moved into said locking position.

3. The lift truck of claim 2 in which:
(a) said locking means further comprises an additional hook-shaped docking finger mounted on the other of said truck rails at the front end thereof and projecting horizontally beyond said front end, said additional finger also having a downwardly-projecting end portion for fitting into a slot in the other of said cubicle rails when said other truck and cubicle rails are substantially axially aligned, thereby restraining said other truck and cubicle rails against horizontal movement with respect to each other,
(b) said locking means further comprises an additional locking member slidably mounted on said other truck rail and selectively movable into a locking position beneath said other cubicle rail wherein said additional locking member cooperates with said additional docking finger to lock said other truck and cubicle rails against vertical movement with respect to each other,
and said lift truck further comprises:
(c) additional insertion-blocking means effective when in a first position for blocking insertion motion of said movable switchgear unit on said truck rails and effective in a second position to provide no blocking of insertion motion of said switchgear unit on said truck rails, and
(d) means for preventing operation of said second insertion-blocking means from said first to said second position until said additional locking means has been operated into a position for locking said truck rails to said cubicle rails in substantially axially aligned relationship.

4. The lift truck of claim 1 in which:
(a) said locking means comprises a hook-shaped docking finger mounted on one of said truck rails at the front end thereof and projecting horizontally beyond said front end, said finger having a downwardly projecting end portion for fitting into a slot in one of said cubicle rails when a set of said truck and cubicle rails are substantially axially aligned, thereby restraining said set of truck and cubicle rails against horizontal movement with respect to each other,
(b) said docking finger is located adjacent one transverse side of the rails of said set when said rails are locked together, and
(c) the rails of said set are adapted to receive rollers on said switchgear unit that support said switchgear unit on said set of rails, the rails of said set including guide means for forcing said rollers in rolling on said set of rails past said docking finger to follow a path wherein the rollers are transversely spaced from said docking finger.

5. The apparatus of claim 4 in which:
(a) the rails of said set have a transversely inner edge,
(b) said rollers have peripheral grooves therein, and
(c) said guide means comprises, at said inner edges of said rails of said set, projecting lip structure cooperating with said grooves for forcing said rollers to follow a path that keeps said rollers spaced transversely inwardly from said docking fingers while rolling past said docking fingers.

* * * * *